(12) United States Patent
Kumar et al.

(10) Patent No.: US 10,940,813 B2
(45) Date of Patent: Mar. 9, 2021

(54) UNIVERSAL PLATFORM ARCHITECTURE FOR HYBRID MORE ELECTRIC AIRCRAFT

(71) Applicant: Hamilton Sundstrand Corporation, Charlotte, NC (US)

(72) Inventors: Dhananjay Kumar, Bangalore (IN); Vaibhav Kumar Somani, Bangalore (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 191 days.

(21) Appl. No.: 16/106,484

(22) Filed: Aug. 21, 2018

(65) Prior Publication Data
US 2019/0375350 A1    Dec. 12, 2019

(30) Foreign Application Priority Data
May 3, 2018 (IN) .............................. 201811016787

(51) Int. Cl.
| | | |
|---|---|---|
| *B60R 16/00* | (2006.01) | |
| *B60R 16/023* | (2006.01) | |
| *B23K 9/10* | (2006.01) | |
| *H02M 7/217* | (2006.01) | |

(52) U.S. Cl.
CPC ........ *B60R 16/0238* (2013.01); *B23K 9/1043* (2013.01); *H02M 7/2173* (2013.01); *H02M 7/2176* (2013.01)

(58) Field of Classification Search
CPC .... B64D 2221/00; B64D 27/00; B60R 16/00; H02J 7/00; B64C 39/00; H02M 7/00
See application file for complete search history.

(56) References Cited

U.S. PATENT DOCUMENTS

| | | |
|---|---|---|
| 6,054,674 A | 4/2000 | Moriguchi et al. |
| 6,269,015 B1 | 7/2001 | Ikeda et al. |
| 6,385,057 B1 | 5/2002 | Barron |
| 9,236,812 B2 * | 1/2016 | White ................. H02M 7/217 |
| 9,561,760 B2 | 2/2017 | Shander et al. |
| 9,783,317 B2 | 10/2017 | Blumer et al. |
| 2008/0100135 A1 * | 5/2008 | Lazarovich ............... H02J 7/02 307/9.1 |

(Continued)

OTHER PUBLICATIONS

European Search Report for European Application No. 19172566.2; Application Filing Date May 3, 2019; dated Nov. 29, 2019 (8 pages).

*Primary Examiner* — Rexford N Barnie
*Assistant Examiner* — Joseph N Inge
(74) *Attorney, Agent, or Firm* — Cantor Colburn LLP

(57) ABSTRACT

An aircraft power system includes a front-end power converter and a back-end power converter. The front-end power converter is configured to generate a first direct current (DC) supply voltage or a second DC supply voltage based on a voltage level of an alternating current (AC) supply voltage output from an AC voltage source. The backend power converter sub-system is configured to convert the first DC supply voltage or the second DC supply voltage into a backend supply voltage. An active power distribution system is configured to select different electrical paths between the front-end converter and the backend converter subsystem in response to detecting output of the first DC supply voltage and the second DC supply voltage.

20 Claims, 9 Drawing Sheets

(56) References Cited

U.S. PATENT DOCUMENTS

| | | | |
|---|---|---|---|
| 2010/0080030 A1* | 4/2010 | Wiegman | H02M 5/4585 363/131 |
| 2011/0273010 A1* | 11/2011 | Tardy | H02J 4/00 307/9.1 |
| 2012/0104857 A1* | 5/2012 | Lai | H02M 3/33523 307/66 |
| 2014/0333127 A1* | 11/2014 | Edwards | H02J 4/00 307/9.1 |
| 2016/0070266 A1* | 3/2016 | DiVito | H02P 3/14 307/9.1 |
| 2017/0279287 A1* | 9/2017 | Solodovnik | H02J 7/045 |
| 2017/0366100 A1* | 12/2017 | Singh | H02M 7/217 |
| 2018/0001994 A1 | 1/2018 | Morrison | |
| 2018/0362181 A1* | 12/2018 | Iwashima | H02M 7/12 |

* cited by examiner

US 10,940,813 B2

1

UNIVERSAL PLATFORM ARCHITECTURE FOR HYBRID MORE ELECTRIC AIRCRAFT

CROSS-REFERENCE TO RELATED APPLICATIONS

This application claims the benefit of Indian Application No. 201811016787 filed May 3, 2018, which is incorporated herein by reference in its entirety.

BACKGROUND

Exemplary embodiments pertain generally to the art of aircraft systems, and more particularly, to more-electric aircraft systems.

Recent trends in the aircraft industry to pursue lighter and more efficient aircraft have led to the development of more-electric aircraft (MEA) and more-electric engine (MEE) systems. MEA systems are intended to replace one or more the pneumatic systems with electrically powered systems. Conventional MEA systems typically include individual electrical platforms to power the motor and direct current (DC) loads, respectively.

BRIEF DESCRIPTION

According to a non-limiting embodiment aircraft power system includes a front-end power converter and a back-end power converter. The front-end power converter is configured to generate a first direct current (DC) supply voltage or a second DC supply voltage based on a voltage level of an alternating current (AC) supply voltage output from an AC voltage source. The backend power converter sub-system is configured to convert the first DC supply voltage or the second DC supply voltage into a backend supply voltage. An active power distribution system is configured to select different electrical paths between the front-end converter and the backend converter subsystem in response to detecting output of the first DC supply voltage and the second DC supply voltage.

According to another non-limiting embodiment, a method of controlling an aircraft power system includes generating, via a front-end power converter, a first direct current (DC) supply voltage or a second DC supply voltage based on a voltage level of an alternating current (AC) supply voltage output from an AC voltage source, and converting, via a backend power converter sub-system, the first DC supply voltage or the second DC supply voltage into a backend supply voltage. The method further includes selecting, via an active power distribution system, different electrical paths between the front-end converter and the backend converter subsystem in response to detecting output of the first DC supply voltage and the second DC supply voltage.

BRIEF DESCRIPTION OF THE DRAWINGS

The following descriptions should not be considered limiting in any way. With reference to the accompanying drawings, like elements are numbered alike.

2

Figure 4:
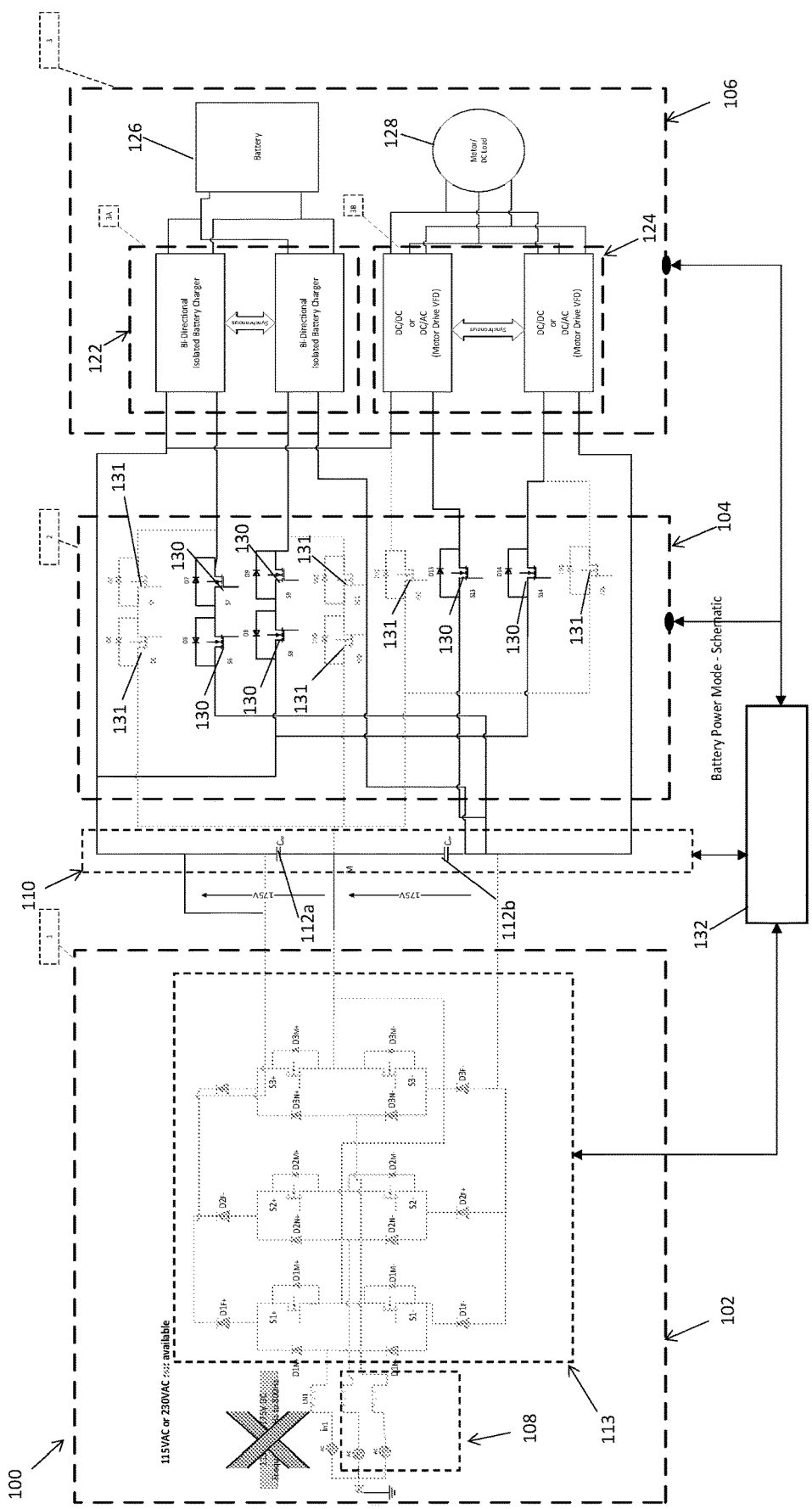
Figure 5:
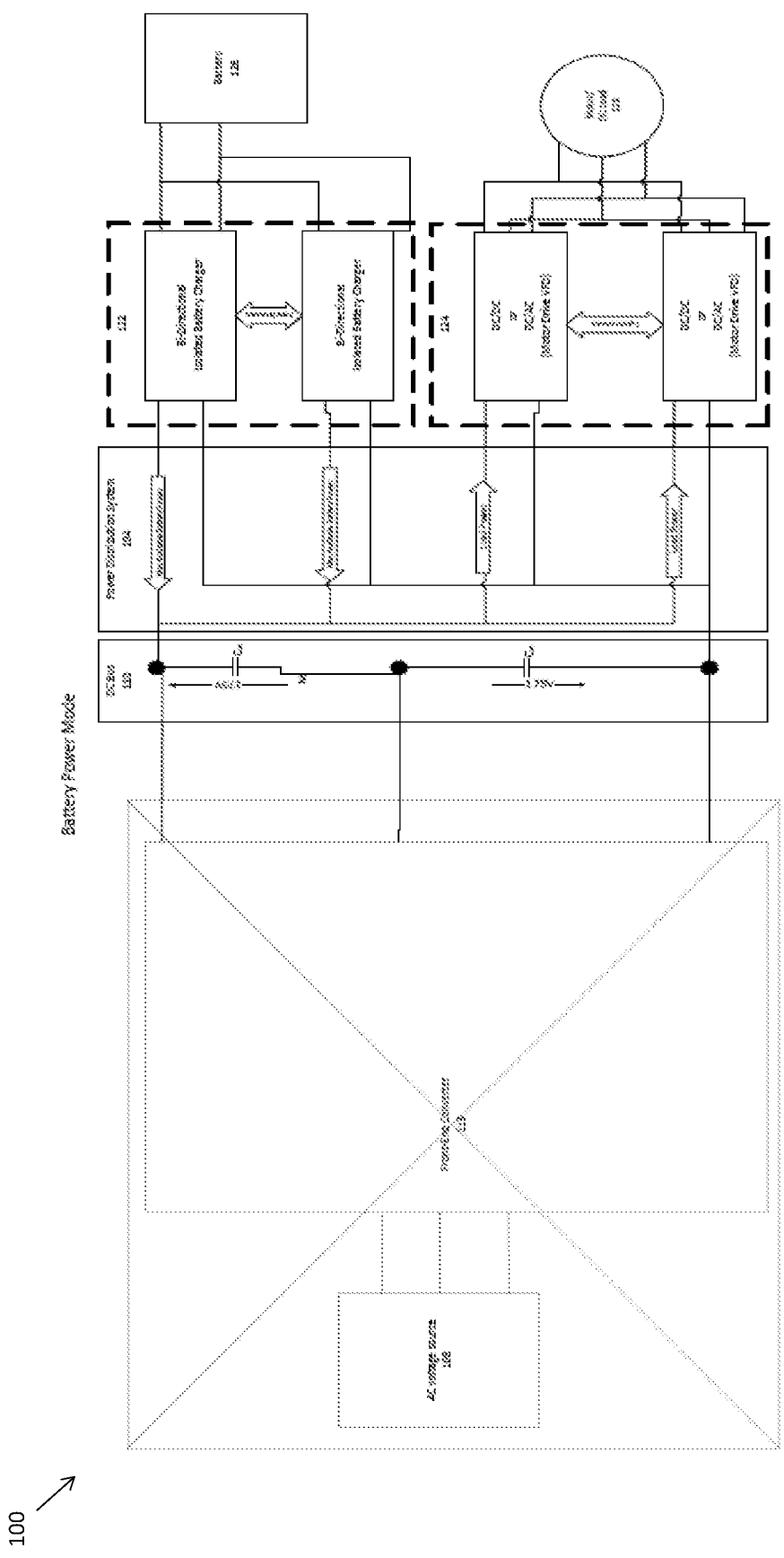
Figure 6:
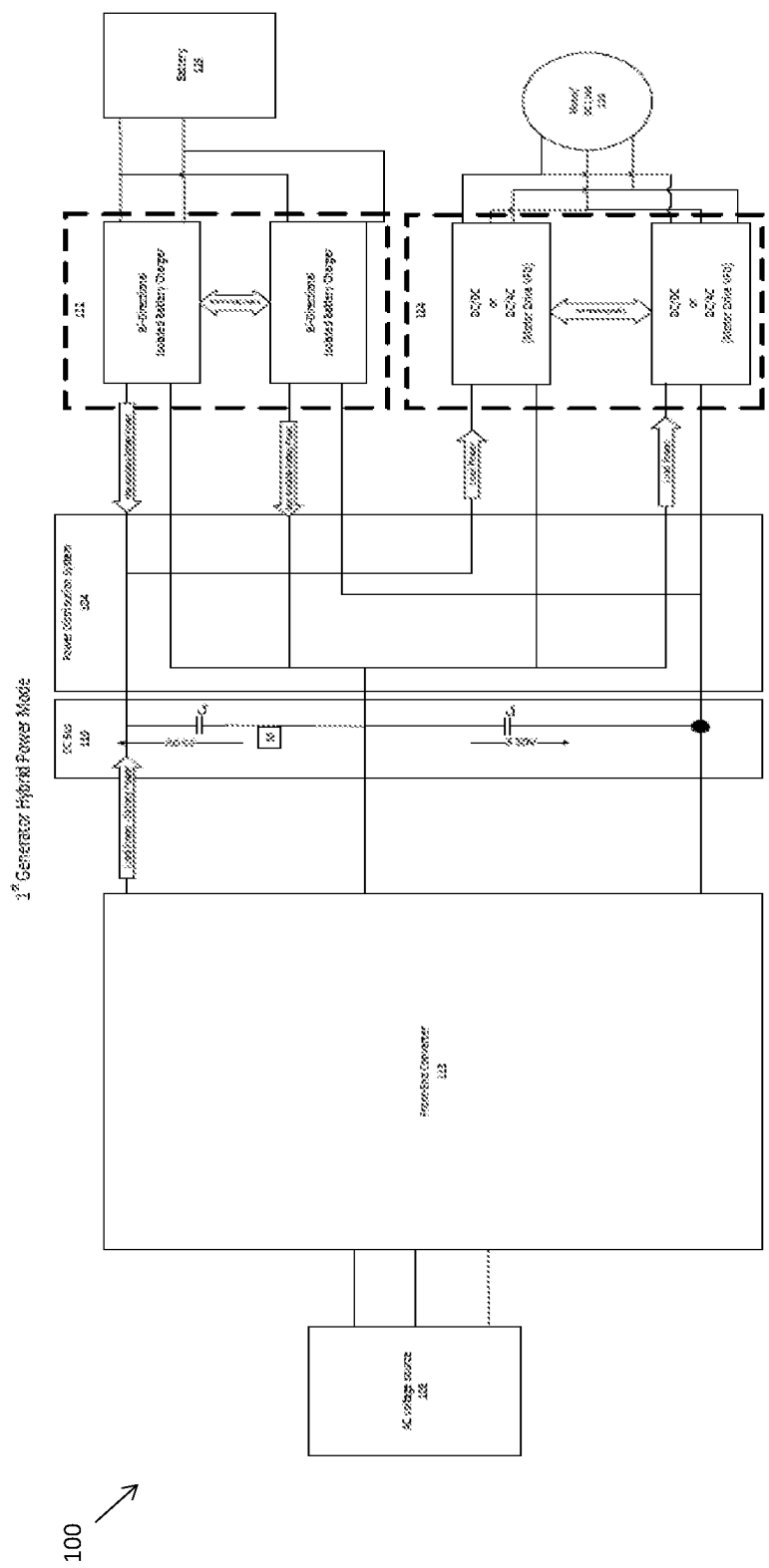
Figure 7:
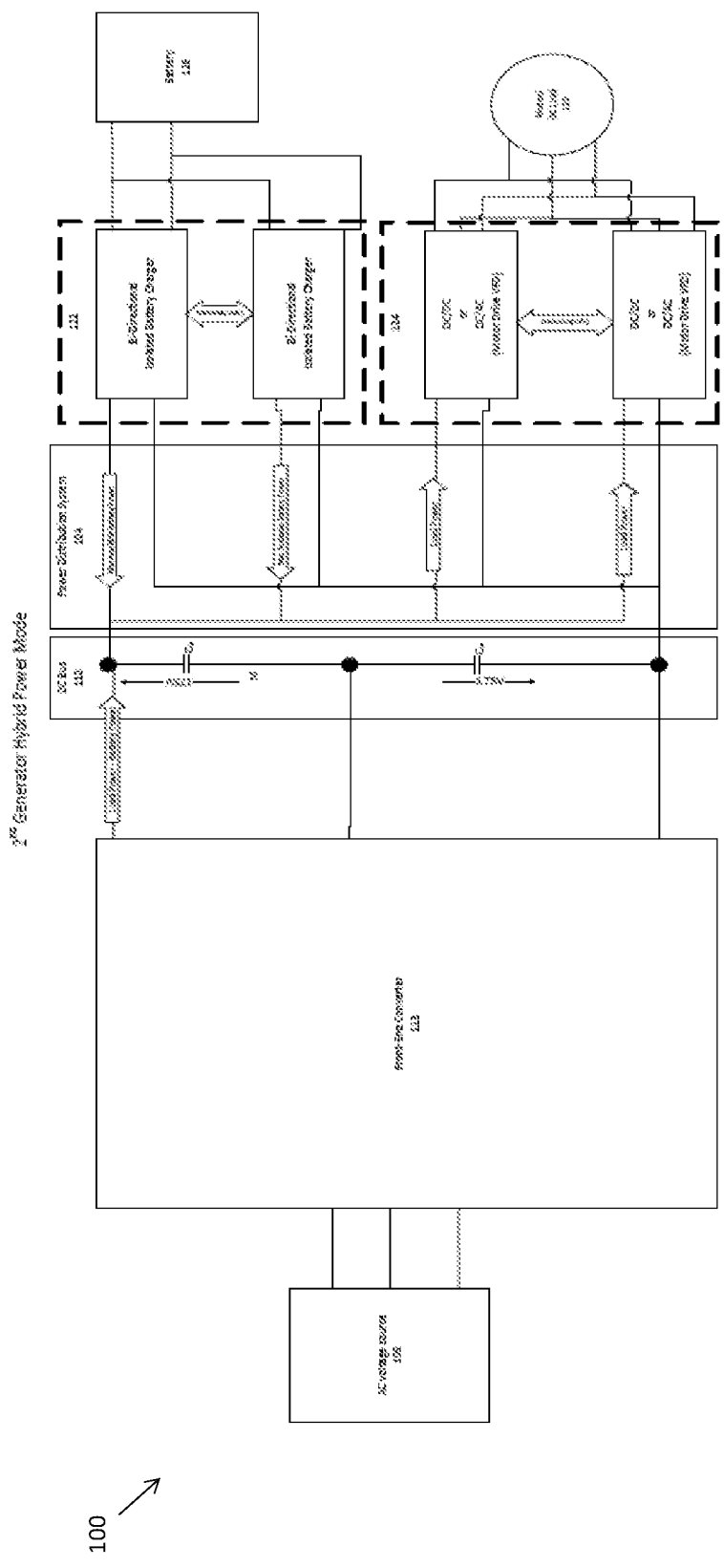
Figure 8A:
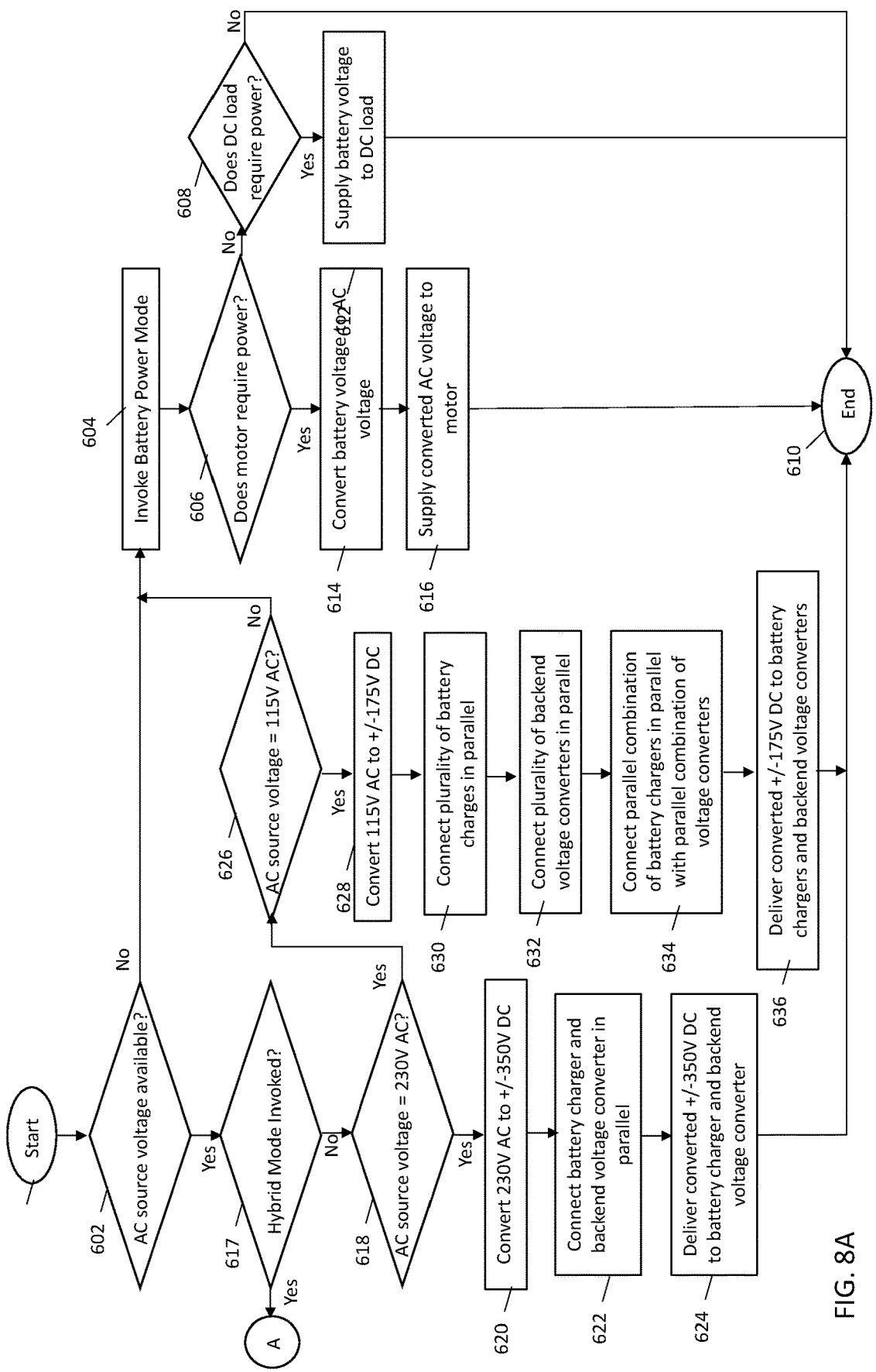
Figure 8B:
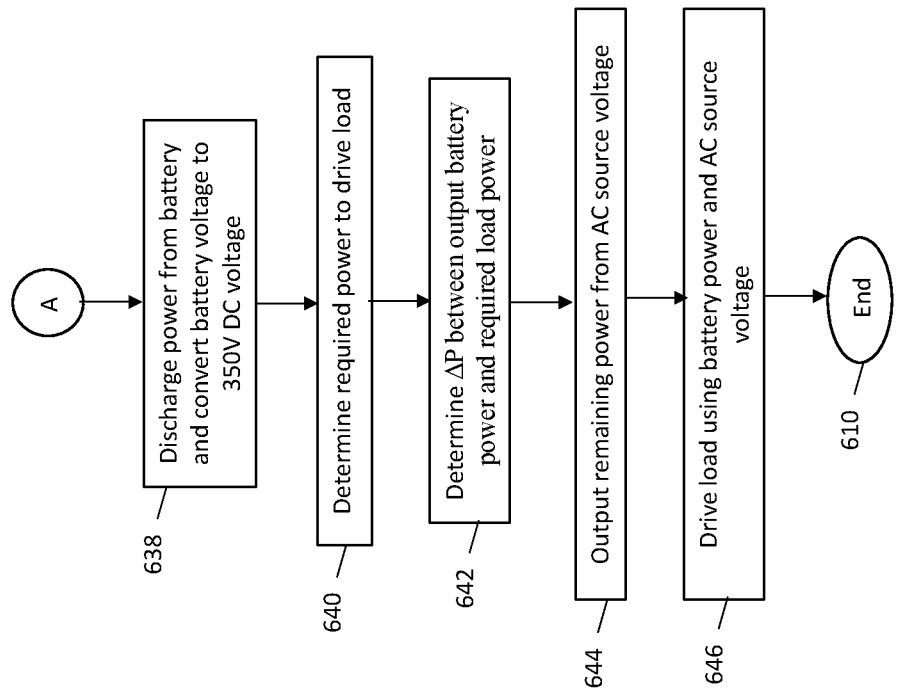

FIG. 4 is a schematic diagram of a hybrid MEA power system operating in a battery power mode according to a non-limiting embodiment;

FIG. 5 is a block diagram illustrating the flow of battery power between the battery chargers and the voltage converter circuits when operating in the battery power mode according to a non-limiting embodiment;

FIG. 6 is a block diagram illustrating the flow of power when operating in a first hybrid power mode according to a non-limiting embodiment;

FIG. 7 is a block diagram illustrating the flow of power when operating in a second hybrid power mode according to another non-limiting embodiment; and FIGS. 8A-8B illustrate a flow diagram of a method for controlling a hybrid MEA power system according to a non-limiting embodiment.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments described herein provide a hybrid MEA power system operable on an aircraft. The hybrid MEA power system includes a cascaded arrangement of a front-end converter, an active power distribution system, and a backend converter to provide a universal alternating current to direct current (AC-DC) or AC to AC (AC-AC) converter, which is configured to convert alternating current (AC) to direct current (DC) or AC to AC. The universal converter is capable of handling variable frequency and magnitude commonly found in aerospace applications while still providing shoot-through protections.

In one or more non-limiting embodiments, the universal converter converts a three-phase AC supply voltage (e.g., 230V AC or 115V AC) with three-phase variable frequency (e.g., about 360 Hz to about 800 Hz) to a DC supply voltage (e.g., +/−350V DC or +/−175V DC). The DC supply voltage can then be converted into a fixed DC voltage (e.g., 28V DC), and utilized to drive the aircraft battery charger or drive various aircraft DC loads. The converted fixed DC voltage can also be converted into a secondary backend AC supply voltage, which drives various motor applications such as flight control actuation, electronic braking, thrust reversal, or environmental motor control. Accordingly, a hybrid MEA power system is provided that can selectively generate power using an aircraft generator or an aircraft battery. Thus, in absence of AC power source, for example, the aircraft can still be powered using the battery power. The hybrid electrical architecture described herein also provides smart motor load sharing capability between two or more inverters working in synchronization, while protecting the motor or load from phase short circuits such as, for example, short-to-ground faults.

Figure 1:
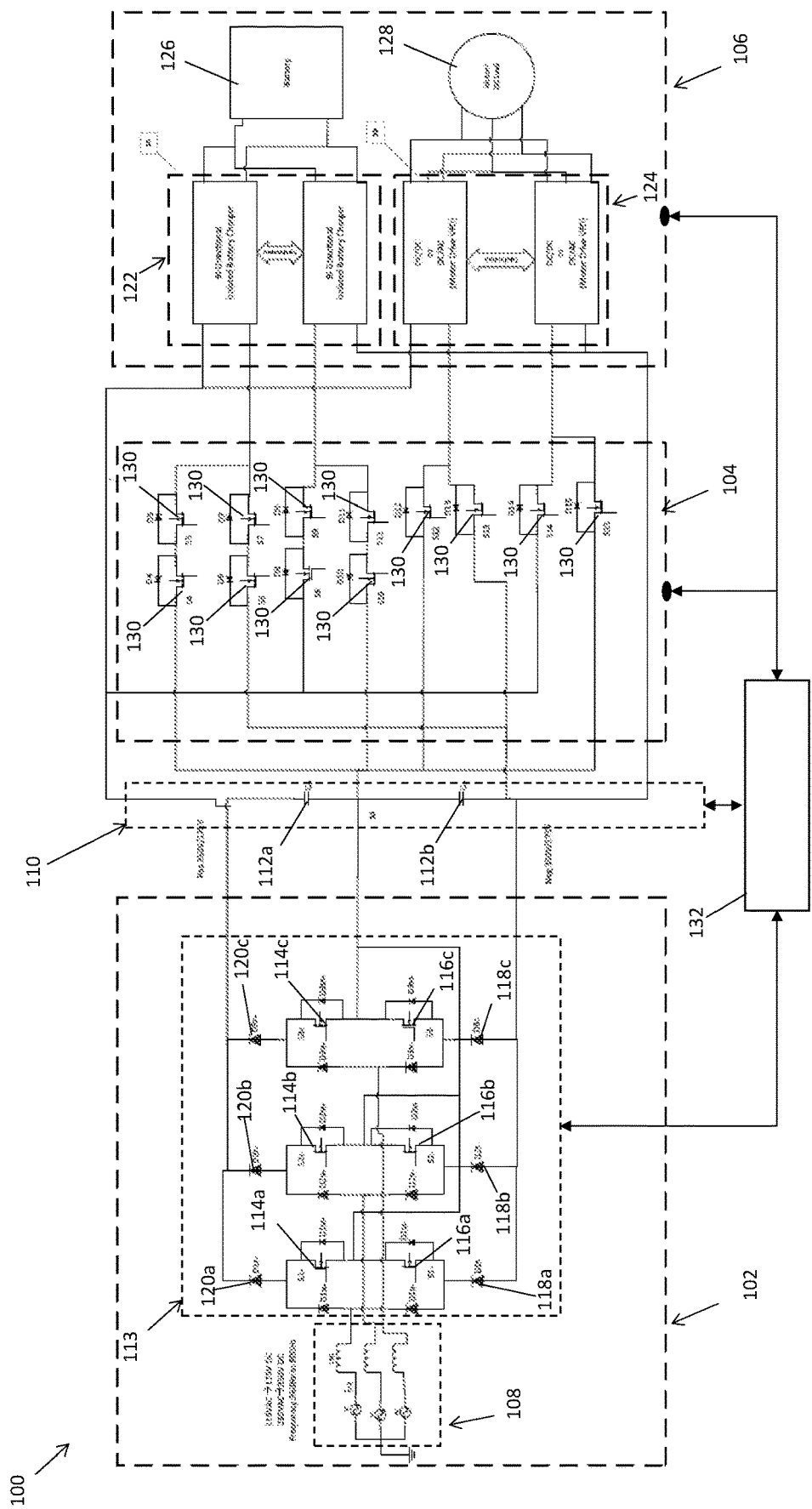
FIG. 1 is a schematic diagram of a hybrid MEA power system according to a non-limiting embodiment.

With reference now to FIG. 1, a hybrid aircraft power system 100 is illustrated according to a non-limiting embodiment. The hybrid aircraft power system 100 includes a front-end power converter 102, an active power distribution system 104, and a backend power converter sub-system 106. The hybrid aircraft power system 100 is capable of operating in different power modes to distribute power between the front-end power converter 102 and a backend power converter sub-system 106, while also sharing power among the individual components of the backend power converter sub-system 106.

The front-end power converter 102 is connected to an AC voltage source 108 to receive an AC supply voltage. The AC voltage source 108 can selectively output a first three-phase voltage having a first voltage level of about 230V AC, for example, and a second three-phase voltage having a second voltage level of about 115V AC, for example. Accordingly, the front-end power converter 102 is configured to generate a first DC supply voltage (e.g., +/−350V DC or 700V DC across the entire bus) or a second DC supply voltage (e.g., +/−175V DC, or 350V across the entire bus) based on a voltage level of the AC supply voltage (e.g., 230V AC or 115 V AC) output from an AC voltage source 108.

The output of the front-end converter 102 can be connected to a DC bus 110 including a positive rail capacitor 112a and a negative rail capacitor 112b. The positive terminal of capacitor 112a can serve as a positive rail connection to the backend converter subsystem 106, while the negative terminal of capacitor 112b can serve as a negative rail connection to the backend converter sub-system 106. According to various embodiments, the series connection between the positive rail capacitor 112a and negative rail capacitor 112b may protect the input to the backend converter sub-system 106 because the DC bus voltage does not exceed one half of the front-end rectifier high rail to low rail output voltage.

In one or more embodiments, the front-end power converter 102 converts the first AC supply voltage (e.g., 230 V AC) to a first DC supply voltage having a voltage level of about +/−350V DC, for example, and converts the second AC voltage (e.g., 115V AC) to a second DC supply voltage having a voltage level of about +/−175V DC, for example. In one or more embodiments, the front-end power converter 102 includes a multi-phase (e.g., three-phase) rectifier circuit 113 that rectifies the first three-phase voltage (e.g., 230 V AC) to generate the first DC supply voltage (+/−350V DC), and rectifies the second three-phase voltage (e.g., 115 V AC) to generate the second DC supply voltage (+/−175V DC). The multi-phase rectifier 113 includes a plurality of switching stages, each switching stage including a lower switch 116a, 116b and 116c connected in series with an upper switch 114a, 114b and 114c, respectively. Each lower switch 116a, 116b and 116c is connected to a cathode of a lower diode 118a, 118b and 118c, respectively, while each upper switch 114a, 114b and 114c is connected to an anode of an upper diode 120a, 120b, 120c, respectively. The lower diodes 118a, 118b and 118c include an anode connected to a lower capacitor 112b, and the upper diodes 120a, 120b, 120c include a cathode connected to the upper capacitor 112a. In at least one embodiment, the multi-phase rectifier circuit 113 can be constructed, for example, as a Vienna rectifier.

The DC supply voltage applied to the DC bus 110 is delivered to the backend converter sub-system 106 via the active power distribution system 104. In one or more embodiments, the backend converter sub-system 106 receives either the first DC supply voltage (+/−350V DC) or the second DC supply voltage (+/−175V DC) based on the operating mode of the hybrid MEA power system 100, and is configured to convert the first DC supply voltage or the second DC supply voltage into a backend supply voltage. The backend supply voltage can include a fixed DC voltage (e.g., 28V DC) and/or another (e.g., third) AC supply voltage.

In at least one non-limiting embodiment, the backend converter sub-system 106 includes one or more bi-directional battery charger circuits 122 and one or more voltage converter circuits 124. The bi-directional battery charger circuit 122 includes a first input in signal communication with the DC Bus 110, a second input in signal communication with an output of the active power distribution system 104, and an output in signal communication with a battery 126 installed on the aircraft. Accordingly, the bi-directional battery charger circuit 122 can charge the battery 126 based on the first DC supply voltage or the second DC supply voltage delivered to the DC bus 110.

The voltage converter circuit 124 can include a DC-to-DC converter circuit and/or a DC-AC converter circuit. A voltage converter circuit 124 constructed as a DC-to-DC converter circuit can be utilized to convert the first DC supply voltage or the second DC supply voltage into a third DC supply voltage having a different voltage level (e.g., 28V DC) that drives a DC load (not shown) installed on the aircraft. The DC loads include, but are not limited to, cabin and cockpit lighting and display systems, and latching of solenoids used in electrohydraulic actuator systems. A voltage converter circuit 124 constructed as a DC-to-AC converter circuit can be utilized to convert the first DC supply voltage or the second DC supply voltage into a variable supply voltage of phase, frequency and amplitude as per the drives requirement of a motor 128 installed on the aircraft. In case of 128 as dc load, same 124 could be configured as Constant Voltage Current Source for driving the string of LED used to replace the halogen lights in recent MEA application.

The active power distribution system 104 includes a network of individual switches 130 and a power distribution controller 132. Unlike conventional MEA power systems, the active power distribution system 104 included in the hybrid MEA power system 100 can invoke different power modes, which in turn establishes different electrical paths between the front-end converter 102 and the backend converter subsystem 106. In one or more embodiments, the different power modes are selected based on the AC voltage supplied by the AC power source 108 and/or the DC supply voltage measured at the DC bus 110. In this manner, the hybrid MEA power system 100 can selectively provide different power sources using an aircraft generator (e.g., the AC power source 108) or the aircraft battery 126.

Each switch 130 is operable in an open state and a closed state. In one or more embodiments, the switches 130 are constructed as field effect transistors (FETs). Accordingly the power distribution controller 132 can invoke the open state (i.e., deactivate the switch) and the closed state (e.g., activate the switch) by applying a control signal to the gate of the FET 130. In one or more embodiments, the power distribution controller 132 can activate and deactivate various combinations of the switches 130 to establish different electrical paths between the front-end power converter 102 and the backend power converter sub-system 106.

Figure 2:
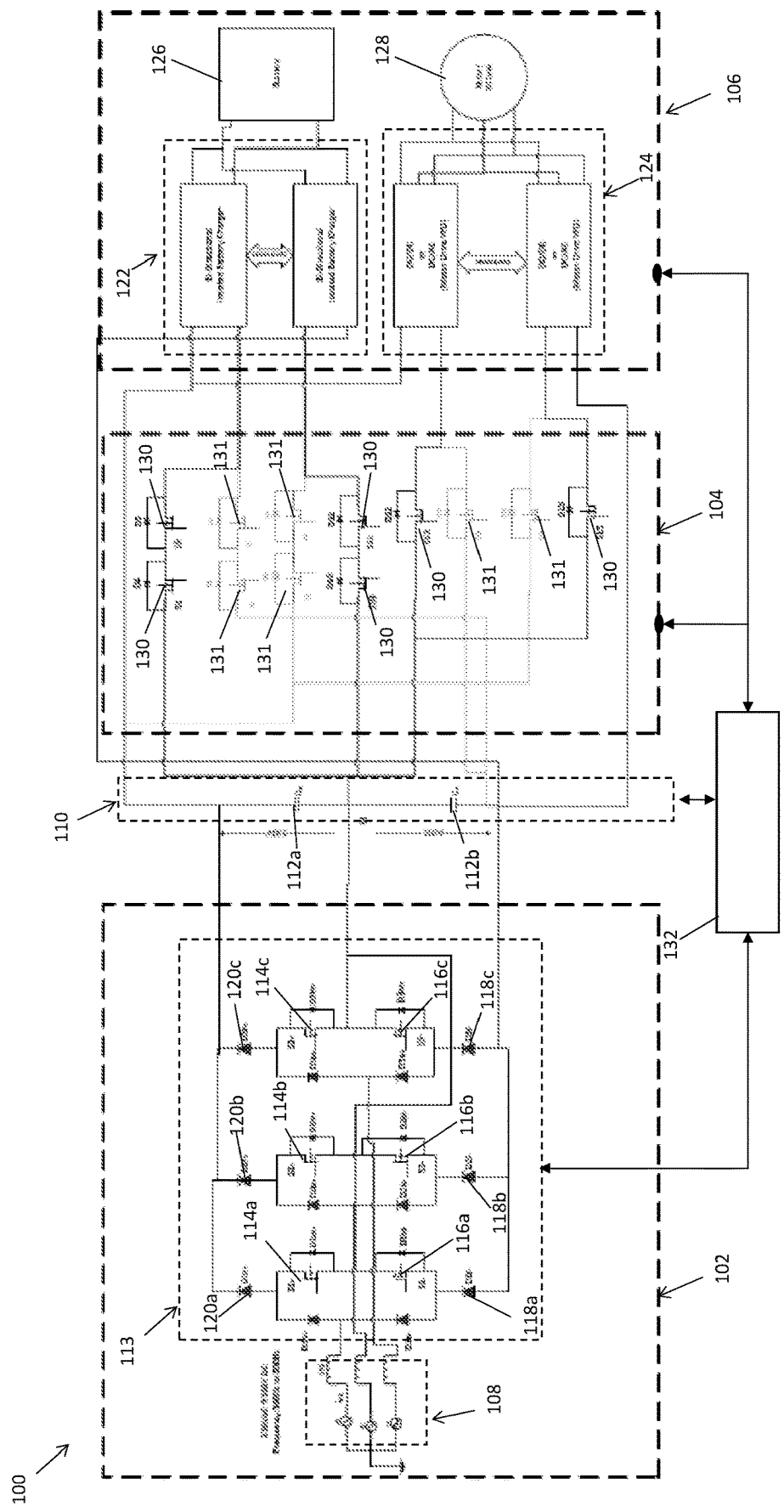
FIG. 2 is a schematic diagram of a hybrid MEA power system operating in a first generator power mode according to a non-limiting embodiment.

Turning to FIG. 2, the hybrid aircraft power system 100 is illustrated following the power distribution controller 132 initiating a first generator power mode in response to detecting input of the first AC supply voltage (e.g., 230V AC). In another embodiment, the power distribution controller 132 initiates the first generator power mode in response to detecting the first DC voltage level (+/−350V DC) at the DC bus 110. In response to invoking the first generator power mode, the power distribution controller 132 activates a first combination of switches 130 while deactivating a first combination of switches 131. Accordingly, a first electrical path is established between the front-end power converter 102 and the backend power converter sub-system 106. The first electrical path defines a first electrical connection between the at least one bi-directional battery charger circuit 122 and at least one voltage converter circuit 124. In at least one embodiment, the first electrical connection establishes a parallel connection between the at least one battery charger circuit 122 and the at least one voltage converter circuit 124.

Figure 3:
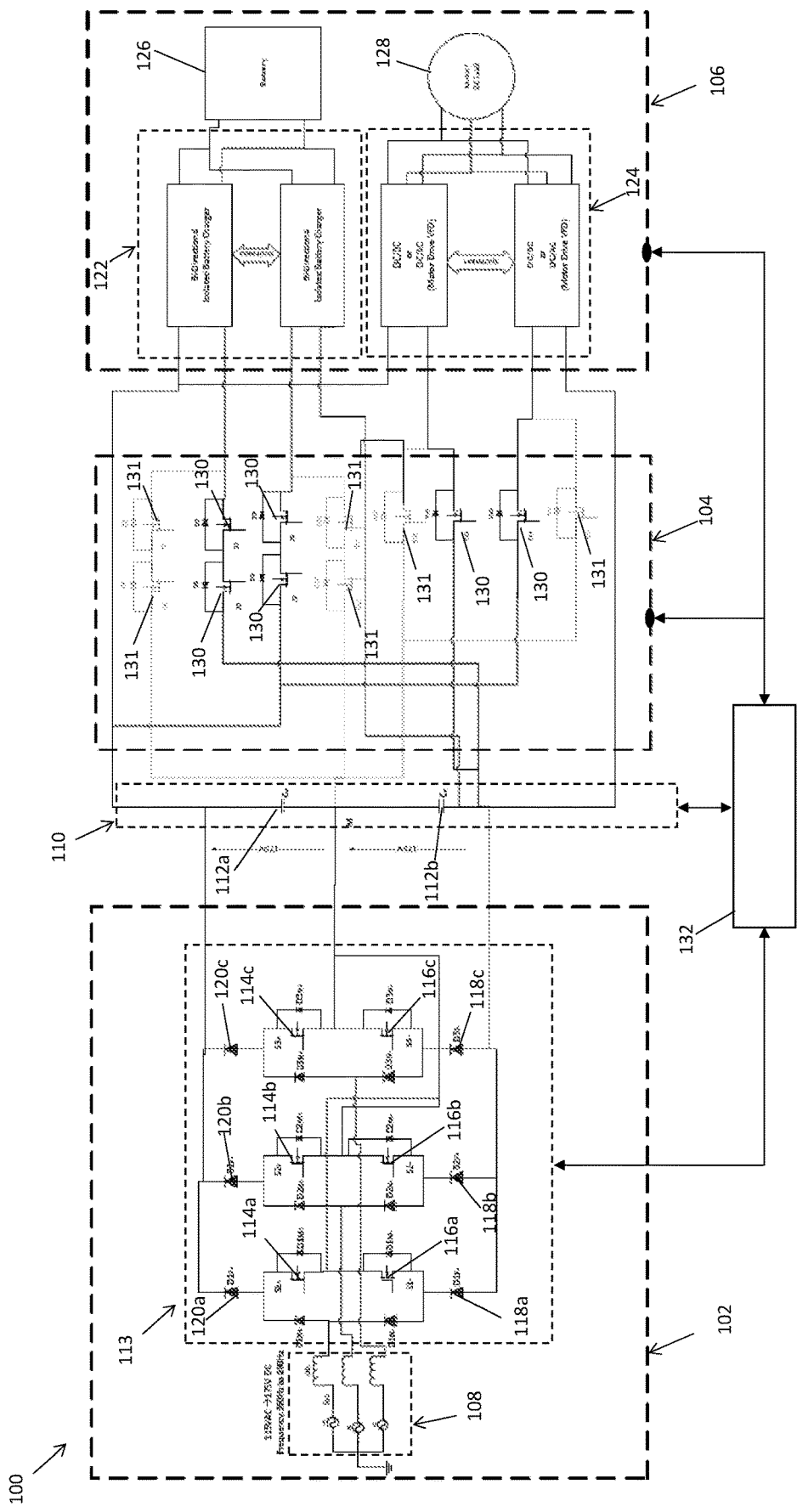
FIG. 3 is a schematic diagram of a hybrid MEA power system operating in a second generator power mode according to a non-limiting embodiment.

Turning to FIG. 3, the hybrid aircraft power system 100 is illustrated following the power distribution controller 132 initiating a second generator power mode in response to detecting input of the second AC supply voltage (e.g., 115V AC). In another embodiment, the power distribution controller 132 initiates the second generator power mode in response to detecting the second DC voltage level (+/−175V DC) at the DC bus 110. In response to invoking the second generator power mode, the power distribution controller 132 activates a second combination of switches 130 while deactivating a second combination of switches 131. Accordingly, a different second electrical path is established between the front-end power converter 102 and the backend power converter sub-system 106.

The second electrical path defines a different second electrical connection between the at least one bi-directional battery charger circuit 122 and the at least one of a voltage converter circuit 124. For instance, the second electrical connection can establish a first parallel connection between a plurality of battery charger circuits 122 and a second parallel connection between a plurality of voltage converter circuits 124 such that the first parallel connection (e.g., the parallel combination of battery charger circuits 122) is connected in parallel with the second parallel connection (e.g., the parallel combination of voltage converter circuits 124). In case of 115V input, the individual capacitors 112a and 112b shall charge to 175V. Therefore, the DC bus 110 realized 350V. The 350V is then fed to one or more individual bidirectional battery chargers 122. The DC bus 110 also feeds the 350V to the voltage converter circuits 124. Accordingly, the bidirectional battery chargers 122 and the voltage converters 124 are in parallel connection with respect to the DC bus 110.

Referring to FIG. 4, the hybrid aircraft power system 100 is illustrated following the power distribution controller 132 initiating a battery power mode in response to detecting disconnection of the AC voltage source (e.g., either the 230V AC supply or the 115V AC supply). In another embodiment, the power distribution controller 132 can initiate the battery power mode in response to detecting that the voltage at the DC bus 110 is below a threshold value (e.g., below 5V DC). In another embodiment, the power distribution controller 132 can initiate the battery power mode in response to detecting an open circuit between the AC voltage source 108 and the active power distribution system 104.

In response to invoking the battery power mode, the power distribution controller 132 activates a third combination of switches 130 while deactivating a third combination of switches 131. Accordingly, a different third electrical path is established between the front-end power converter 102 and the backend power converter sub-system 106. The third electrical path connects an output of the bi-directional battery charger circuit 122 to one or more voltage converter circuits 124. Further, the third electrical path is configured to share the output of one or more bi-directional battery charger circuits between the voltage converter circuits 124, e.g., one or more DC-to-DC converter circuits 124 and one or more DC-to-AC converter circuits 124. The flow of battery power between the battery chargers 124 and the voltage converter circuits 124 is illustrated in FIG. 5.

In at least one non-limiting embodiment, the power distribution controller 132 can also initiate a hybrid power exchange mode, i.e., a hybrid power mode. When operating in the hybrid mode, the AC voltage source 108 can be either at first voltage level (e.g. 230V AC) or second voltage level (e.g. 115V AC). Turning to FIG. 6, for example, the hybrid mode is shown invoked while the AC voltage source 108 outputs the first voltage level (e.g., 230V AC). Accordingly, the power distribution controller 132 activates a combination of switches 130 and deactivates a combination of switches 131 as illustrated in FIG. 2, to establish electrical path that allows power flow between the bi-directional battery charger circuit 122 and front-end power converter 102 to voltage converter circuits 124. Similarly, FIG. 7 illustrates the hybrid mode invoked while the AC voltage source 108 outputs the second voltage level (e.g. 115V AC). Accordingly, the power distribution controller 132 activates a combination of switches 130 and deactivates a combination of switches 131 as illustrated in FIG. 3, to establish electrical path that allows power flow between the bi-directional battery charger circuit 122 and front-end power converter 102 to voltage converter circuits 124. In either scenario, the power required by load 128 is optimally shared between AC voltage source 108 and battery 126 by maximizing power utilization from battery 126 according to its charge accumulation capacity.

In at least one embodiment, the total power necessary to drive one or more targeted loads is determined. For example, the controller 132 can determine a power differential ($\Delta P$) between the power output from the battery 126 and the power required to drive the load(s). The remaining power necessary to meet the total load power (i.e., the total power necessary to drive the target load) can then be supplied using the AC source voltage 108. Accordingly, the targeted load is driven using both the battery power and the AC source voltage.

Turning now to FIGS. 8A-8B, a flow diagram illustrates a method of controlling a MEA hybrid power system according to a non-limiting embodiment. The method begins at operation 600 and at operation 602 determines whether an AC source voltage is available. When the AC source voltage is unavailable, the method invokes the battery power mode at operation 604, and determines whether one or more motors installed on the aircraft system require power at operation 606. When no motors require power, the method proceeds to operation 608, and determines whether one or more DC loads require power. When no DC loads require power, the method ends at operation 610. When, however, one or more DC loads require power, the method supplies the battery voltage (e.g., 28V DC) to the DC load(s), and the method ends at operation 610.

When one or more motors require power at operation 606, the battery voltage is converted to an AC supply voltage at operation 614. At operation 616, the AC supply voltage is supplied to the motor(s), and the method ends at operation 610.

Turning back to operation 602, the method determines that an AC source voltage is available, proceeds to operation 617 to determine whether the hybrid mode is invoked. When the hybrid mode is not invoked, the method proceeds to operation 618 to determine the power level of the AC source voltage. When the AC source voltage is determined to have a first AC voltage level (e.g., about 230V AC), the method proceeds to operation 620 and converts the first AC voltage level into a first DC voltage level (e.g., +/−350V DC). At operation 622, a first generator mode is invoked and the battery charger(s) and backend voltage converter(s) installed on the aircraft are connected in parallel with one another. At operation 624, the first DC voltage (e.g., +/−350V DC) is delivered to the battery charger(s) and backend voltage converter(s), and the method ends at operation 610.

Turning back to operation 618, when the AC source voltage is determined not to have the first AC voltage level, but has a second AC voltage level (e.g., about 115V AC) at operation 626, the method proceeds to operation 628 and converts the second AC voltage level (e.g., about 115V AC) to a second DC voltage level (e.g. +/−175V DC). Accordingly, a second generator mode is invoked such that a plurality of battery chargers are connected in parallel at operation 630, a plurality of backend voltage converters are connected in parallel at operation 632, and the parallel combination of battery charges and the parallel combination of backend voltage converters are connected in parallel at operation 634. The second DC voltage level is delivered to the battery chargers and the backend converters at operation 636, and the method ends at operation 610. In this manner, the parallel combination of bidirectional battery charger to the voltage converter 124 allows for establishing several parallel combinations of bidirectional battery chargers 122, which can fulfill the power demand of several voltage converter 124, despite the number of voltage converters 124 being greater than the number of bidirectional battery chargers 122, or vice versa.

Referring back to operation 617, when the hybrid mode is invoked the method proceeds to operation 638 (see FIG. 8B) and discharges power from the battery. At operation 640, the total power necessary to drive one or more targeted loads is determined. At operation 642, a power differential (ΔP) between the output battery power and the necessary load power is determined At operation 644, the remaining power necessary to meet the total load power (i.e., the total power necessary to drive the target load) is output from the AC source voltage. At operation 646, the targeted load is driven using both the battery power and the AC source voltage, and the method ends at operation 610.

As described herein, a hybrid MEA power system is provided, which includes a universal converter that converts a three-phase AC supply voltage (e.g., 230V AC or 115V AC) with three-phase variable frequency (e.g., about 360 Hz to about 800 Hz) to a DC supply voltage (e.g., +/−350V DC or +/−175V DC). The DC supply voltage can then be converted into a fixed DC voltage (e.g., 28V DC), and utilized to drive the aircraft battery charger or drive various aircraft DC loads. The converted fixed DC voltage can also be converted into a secondary backend AC supply voltage, which drives various motor applications such as flight control actuation, electronic braking, thrust reversal, or environmental motor control. Accordingly, a hybrid power system for a MEA system is provided that can selectively generate power using an aircraft generator or an aircraft battery. Thus, in absence of AC power, for example, the aircraft can still be powered using the battery power.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft power system comprising:
    a front-end power converter configured to generate a first direct current (DC) supply voltage or a second DC supply voltage based on a voltage level of an alternating current (AC) supply voltage output from an AC voltage source;
    a backend power converter sub-system configured to convert the first DC supply voltage or the second DC supply voltage into a backend supply voltage;
    at least one bi-directional battery charger circuit including an input in signal communication with the front-end power converter and an output in signal communication with a battery installed on the aircraft;
    an active power distribution system in signal communication with the front-end converter, the back-end converter, and the bi-directional battery charger circuit, the active power distribution system configured to select different electrical paths between the front-end converter and the backend converter subsystem in response to detecting output of the first DC supply voltage and the second DC supply voltage,
    wherein the active power distribution system comprises a power distribution controller configured to invoke a hybrid power exchange mode, and in response to invoking the hybrid power exchange mode, selectively deliver from the AC voltage source either a first voltage having a first voltage level of 230V AC or second voltage having a second voltage level of 115V AC, and also delivering the battery power output from the battery via the at least one bi-directional battery charger circuit to drive a DC load.

2. The aircraft power system of claim 1, wherein the active power distribution system comprises:
    a multi-phase rectifier circuit including a plurality of switches operable in an open state and a closed state, wherein
    the power distribution controller configured to invoke the open and closed states of the switches, and wherein different combinations of open and closed switches establish the different electrical paths between the front-end power converter and the backend power converter sub-system.

3. The aircraft power system of claim 2, wherein the power distribution controller invokes a first combination of opened and closed switches to establish a first electrical path between the front-end power converter and the backend power converter sub-system in response to detecting the first DC supply voltage, and invokes a second combination of opened and closed switches to establish a different second electrical path between the front-end power converter and the backend power converter sub-system in response to detecting the second DC supply voltage.

4. The aircraft power system of claim 3, wherein the backend power converter sub-system comprises:
at least one voltage converter circuit including at least one of a DC-to-DC converter circuit and a DC-AC converter circuit.

5. The aircraft power system of claim 4, wherein the first electrical path defines a first electrical connection between the at least one bi-directional battery charger circuit and the at least one voltage converter circuit.

6. The aircraft power system of claim 5, wherein the first electrical connection establishes a parallel connection between the at least one battery charger circuit and the at least one voltage converter circuit.

7. The aircraft power system of claim 4, wherein, the second electrical path defines a different second electrical connection between the at least one bi-directional battery charger circuit and the at least one of a voltage converter circuit.

8. The aircraft power system of claim 7, wherein the second electrical connection establishes a first series connection between a plurality of battery charger circuits and a second series connection between a plurality of voltage converter circuits such that the first series connection is in parallel with the second series connection.

9. The aircraft power system of claim 4, wherein the power distribution controller invokes a third combination of opened and closed switches to establish a third electrical path between the front-end power converter and the backend power converter sub-system in response to detecting disconnection of the AC voltage source.

10. The aircraft power system of claim 9, wherein the third electrical path connects an output of the bi-directional battery charger circuit to the at least one voltage converter circuit.

11. The aircraft power system of claim 10, wherein the third electrical path is configured to share the output of the bi-directional battery charger circuit among the DC-to-DC converter circuit and the DC-to-AC converter circuit.

12. The aircraft power system of claim 4, wherein the at least one bi-directional battery charger circuit is configured to charge the battery based on the first DC supply voltage or the second DC supply voltage.

13. The aircraft power system of claim 12, wherein the DC-to-DC converter circuit is configured to convert the first DC supply voltage or the second DC supply voltage into a third DC supply voltage having a different voltage level that drives the DC load installed on the aircraft.

14. The aircraft power system of claim 13, wherein the DC-to-AC converter circuit is configured to convert the first DC supply voltage or the second DC supply voltage into a second AC supply voltage that drives a motor installed on the aircraft.

15. The aircraft power system of claim 14, wherein the power distribution controller is configured to invoke a hybrid power exchange mode, and in response to invoking the hybrid power exchange mode, and deliver at least one of the first and second AC supply voltages along with battery power output from the battery to drive the DC load.

16. A method of controlling an aircraft power system, the method comprising:
generating, via a front-end power converter, a first direct current (DC) supply voltage or a second DC supply voltage based on a voltage level of an alternating current (AC) supply voltage output from an AC voltage source;
converting, via a backend power converter sub-system, the first DC supply voltage or the second DC supply voltage into a backend supply voltage;
outputting battery power via at least one bi-directional battery charger circuit including an input in signal communication with the front-end power converter and an output in signal communication with a battery;
selecting, via an active power distribution system, different electrical paths between the front-end converter and the backend converter subsystem in response to detecting output of the first DC supply voltage and the second DC supply voltage; and
invoking, via the active power distribution system, a hybrid power exchange mode to selectively deliver from the AC voltage source either a first voltage having a first voltage level of 230V AC or second voltage having a second voltage level of 115V AC, while also delivering the battery power output from the battery via the at least one bi-directional battery charger circuit to drive a DC load.

17. The method of claim 16, wherein selecting the different electrical paths further comprises invoking, via a power distribution controller, open and closed states of switches included in a multi-phase rectifier, and wherein different combinations of the open and closed states establish the different electrical paths between the front-end power converter and the backend power converter sub-system.

18. The method of claim 17, wherein selecting the different electrical paths further comprises invoking a first combination of opened and closed switches to establish a first electrical path between the front-end power converter and the backend power converter sub-system in response to detecting the first DC supply voltage.

19. The method of claim 18, wherein selecting the different electrical paths further comprises invoking a second combination of opened and closed switches to establish a different second electrical path between the front-end power converter and the backend power converter sub-system in response to detecting the second DC supply voltage.

20. The method of claim 19, wherein selecting the different electrical paths further comprises invoking a third combination of opened and closed switches to establish a third electrical path between the front-end power converter and the backend power converter sub-system in response to detecting disconnection of the AC voltage source, the third electrical path configured to share the output of the bi-directional battery charger circuit among the DC-to-DC converter circuit and the DC-to-AC converter circuit.

* * * * *